United States Patent
Wakahara et al.

[11] Patent Number: 5,940,534
[45] Date of Patent: Aug. 17, 1999

[54] ON-LINE HANDWRITTEN CHARACTER RECOGNITION USING AFFINE TRANSFORMATION TO MAXIMIZE OVERLAPPING OF CORRESPONDING INPUT AND REFERENCE PATTERN STROKES

[75] Inventors: Toru Wakahara, Tokyo; Naoki Nakajima; Sueharu Miyahara, both of Kanagawaken; Kazumi Odaka, Saitamaken, all of Japan

[73] Assignee: Nippon Telegraph and Telephone Corporation, Japan

[21] Appl. No.: 08/679,957

[22] Filed: Jul. 15, 1996

[30] Foreign Application Priority Data

Jul. 17, 1995 [JP] Japan ................................. P7-179728

[51] Int. Cl.[6] .................................................. G06K 9/00
[52] U.S. Cl. .......................... 382/187; 382/123; 382/185; 382/201; 382/209; 382/294
[58] Field of Search ..................................... 382/187, 185, 382/186, 188, 189, 294, 123, 190, 195, 201, 202, 209, 181, 182, 159; 379/93.18; 73/865.4; 434/155

[56] References Cited

U.S. PATENT DOCUMENTS

| | | | |
|---|---|---|---|
| 4,607,366 | 8/1986 | Morita et al. | 395/183.04 |
| 4,731,857 | 3/1988 | Tappert | 382/178 |
| 5,113,452 | 5/1992 | Chatani et al. | 382/187 |
| 5,121,441 | 6/1992 | Chefalas et al. | 382/189 |
| 5,319,721 | 6/1994 | Chefalas et al. | 382/160 |
| 5,581,634 | 12/1996 | Heide | 382/226 |
| 5,588,074 | 12/1996 | Sugiyama | 382/209 |
| 5,610,996 | 3/1997 | Eller | 382/187 |
| 5,611,000 | 3/1997 | Szeliski et al. | 382/294 |
| 5,644,652 | 7/1997 | Bellagarda et al. | 382/186 |
| 5,687,254 | 11/1997 | Poon et al. | 382/229 |
| 5,703,963 | 12/1997 | Kojima et al. | 382/197 |
| 5,742,705 | 4/1998 | Parthasarathy | 382/185 |

FOREIGN PATENT DOCUMENTS

| | | |
|---|---|---|
| 583 138 | 8/1993 | European Pat. Off. . |
| 56-59028 | 10/1982 | Japan . |
| 58-13259 | 8/1984 | Japan . |
| 63-206881 | 8/1988 | Japan . |
| 6-176198 | 6/1994 | Japan . |

OTHER PUBLICATIONS

Wakahara, Toru, "On–Line Cursive Script Recognition Using Local Affine Transformation", 1988, pp. 1133–1137.
Odaka, Kazumi, "Stroke–Order–Independent On–Line Character Recognition Algorithm and its Application", pp. 79–85, Jan., 1986.
Article from *IEE Transactions on Pattern Analysis and Machine Intelligence*, vol. 12, No. 8, Aug. 1990, entitled The State of the Art in On–Line Handwriting Recognition, by Charles C. Tappert, Ching Y. Suen and Toru Wakahara.
Article from IEEE Computer Society, Proceedings of the Third International Conference on Document Analysis and Recognition, Aug. 14–16, 1995, entitled "On–Line Cursive Kanji Character Recognition as Stroke Correspondence Problem," by Toru Wakahara et al.

*Primary Examiner*—Edward L. Coles
*Assistant Examiner*—David Rosenblum
*Attorney, Agent, or Firm*—Banner & Witcoff, Ltd.

[57] ABSTRACT

Reference patterns and an input pattern are expressed by the position coordinates of feature points obtained by approximating strokes by a predetermined points in advance. One-to-one stroke correspondences whose stroke-numbers are made equal to each other between reference pattern and the input pattern having different stroke-numbers and different stroke-orders each other are determined, and handwriting distortion is stably absorbed by performing an optimum affine transformation operation for each corresponding stroke pair. The inter-pattern distance between a normalized input pattern obtained by the affine transformation operation and the reference pattern is calculated, and the character categories of the reference patterns are sequentially output as candidate categories in order of increasing distance.

13 Claims, 5 Drawing Sheets

○ WRITTEN POINT
◎ FEATURE POINT

● FEATURE POINT

● FEATURE POINT

FIG.4
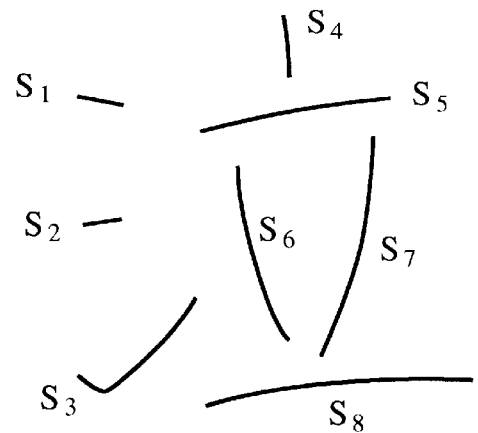
FIG.5
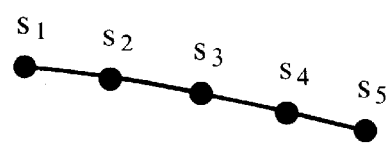
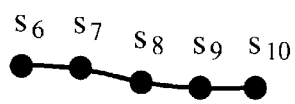
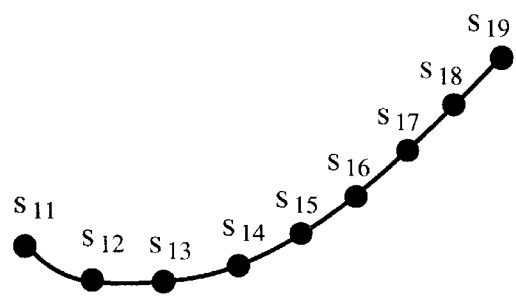

FIG.6A
FIG.6B
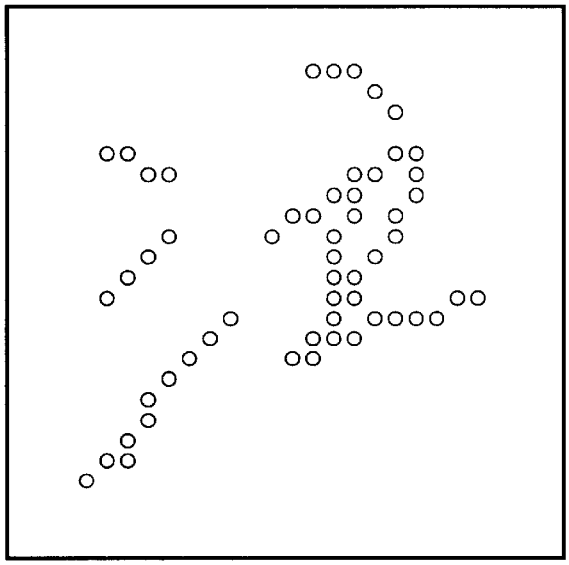
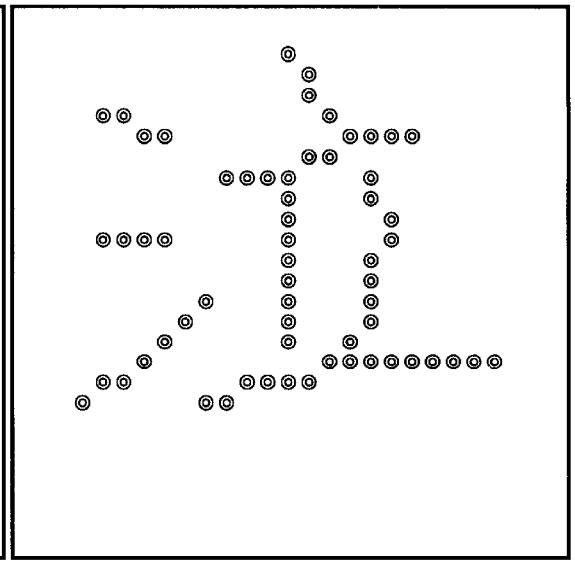
FIG.6C
FIG.6D
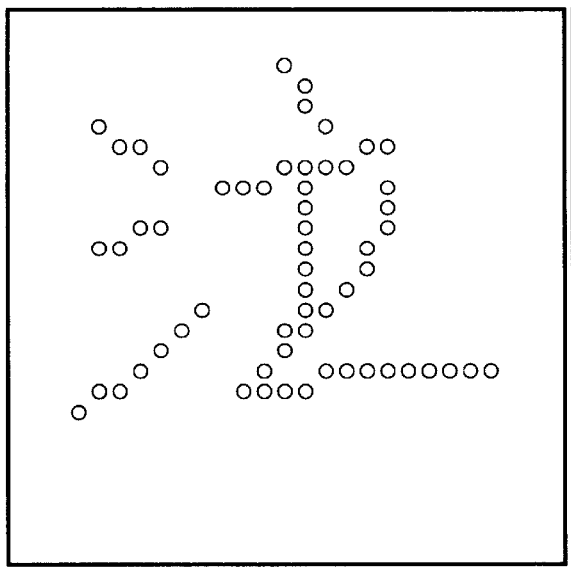
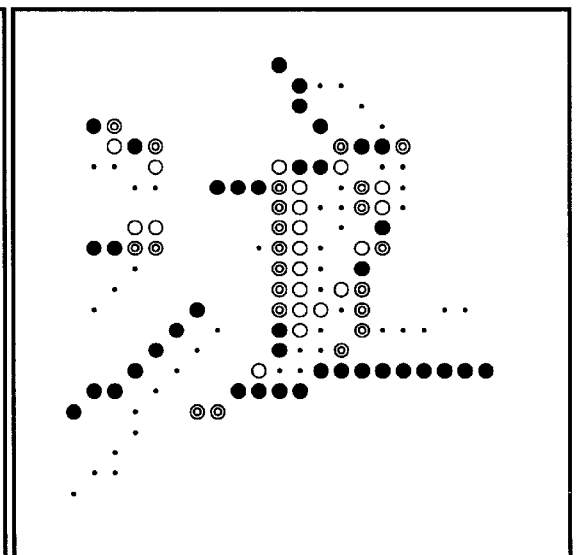

ON-LINE HANDWRITTEN CHARACTER RECOGNITION USING AFFINE TRANSFORMATION TO MAXIMIZE OVERLAPPING OF CORRESPONDING INPUT AND REFERENCE PATTERN STROKES

BACKGROUND OF THE INVENTION

1. Field of the Invention

The present invention relates to an on-line handwritten character recognition method for comparing an input pattern of a character which is handwritten in an arbitrary stroke-number and an arbitrary stroke-order with reference patterns which have correct stroke-numbers and correct stroke-orders and which are prepared for each character category to automatically determine a specific character category corresponding to the input pattern.

2. Prior Art

As a conventional on-line handwritten character recognition technique for improving robustness against handwriting distortion, there is a technique in which expected handwriting distortion, i.e., a variation in inclination or specific running handwriting, is registered in advance.

Thereafter, the following technique is provided. An input pattern and reference patterns are transformed into one-stroke patterns on the assumption that a stroke-order is correct, and pattern matching is performed such that overlapping between feature points is maximized in size while scale change in the time-axis direction is allowed using dynamic programming technique.

The following technique is also provided. That is, as reference patterns, not only average sizes of a large number of handwritten character patterns belonging to character categories, but also information related to handwriting distortion such as a covariance matrix of positional coordinates of feature points constituting each character are stored. Then, a statistical discriminant measure is used between the reference patterns and an input pattern.

However, the conventional handwritten character recognition technique in which expected handwriting distortion is registered has an essential limit because the conventional technique cannot cope with unexpected distortion.

In the conventional handwritten character recognition technique using the dynamic programming technique, large handwriting distortion cannot be entirely absorbed by the scale change in the time-axis direction, an enormous time is disadvantageously required for processing.

In the conventional handwriting character recognition technique using the statistic discriminant measure, an enormous number of handwritten character patterns must be collected to obtain stable statistic information in advance. In addition, since not only average values, but also information such as a covariance matrix are stored as reference patterns, the dictionary size for the reference patterns is considerably increased.

In order to solve the above problems, a technique described in Japanese Patent Application Laid-Open No. 63-206881. The outline of this technique is as follows. Only average position coordinates of each feature point of a plurality of handwritten character categories which are written in a correct stroke-number and a correct stroke-order are stored as a reference pattern of each character category, and an input pattern in which position coordinates of each feature point are stored with respect to a character handwritten in an arbitrary stroke-number and an arbitrary stroke-order is constituted. A one-to-one feature point correspondence between the input pattern and the reference patterns of character categories is determined. Such affine transformation operation is iteratively performed that overlapping between the feature points in a predetermined portion near each feature point of a reference pattern and the corresponding feature points of the input pattern is maximized. Thus, after distorting the reference patterns, stable pattern matching is performed.

This technique can theoretically solve the above problems. That is, the technique can absorb arbitrary handwriting distortion by iteratively performing the local affine transformation operation, and has a small dictionary size for reference patterns. However, the technique still has the following problems. That is, trial and error must be performed to determine the optimum size of the predetermined portion near which the local affine operation is performed and to control the number of iterative operations for preventing excessive absorption of handwriting distortion, and enormous time is required to iteratively perform an optimum local affine transformation operation for each feature point.

As described above, in the conventional on-line handwritten character recognition technique for improving robustness against handwriting distortion, an essential means which can absorb large or unexpected handwriting distortion and can minimize a dictionary size and a processing time has not been obtained.

SUMMARY OF THE INVENTION

The present invention has been made in consideration of the above circumstances, and has as its object to provide an on-line handwritten character recognition method in which pattern matching between an input pattern whose handwriting distortion is large and reference patterns which are stored as average shapes written in correct stroke-numbers and correct stroke-orders is performed to stably absorb handwriting distortion, and which has high recognition capability while sufficiently suppressing an average capacity and a processing time, and an apparatus therefor.

In order to achieve the above object, the present invention provides an on-line handwritten character recognition method comprising the steps of: expressing strokes constituting a character by a predetermined number of feature points for each character category and storing position coordinates of the feature points as reference patterns in advance; expressing an input pattern of an input handwritten character by the feature points; extracting the reference pattern for each character category; determining a one-to-one stroke correspondence which absorbs variations in stroke-number and stroke-order between the extracted reference pattern and the input pattern; determining an affine transformation operation for each corresponding stroke of the input pattern such that overlapping between the stroke and corresponding stroke of the extracted reference pattern is maximized; performing an affine transformation operation to each stroke of the input pattern on the basis of the determined affine transformation operation to form a normalized input pattern; and calculating an inter-pattern distance based on the sum of distances of corresponding stroke pairs between the extracted reference pattern and the normalized input pattern, characterized in that, on the basis of the inter-pattern distances between all reference patterns and normalized input patterns formed for all the reference patterns, character categories are sequentially output as candidate categories related to the input pattern from character categories according to reference pattern having small inter-pattern distance.

According to the present invention, recognition accuracy can be considerably improved when a character includes large or unexpected handwriting distortion. In particular, since a uniform affine transformation operation is not performed to an overall pattern or to each feature point, but is performed to each stroke, a stable normalizing operation which is not too hard and too soft can be realized. In addition, not only improvement of such robustness against handwriting distortion can be realized, but also a decrease in dictionary size can be realized. A processing time can be sufficiently suppressed.

In a preferred embodiment of the present invention, in determination of the affine transformation operation, the affine transformation operation is performed to the plurality of strokes including a current stroke and a proper number of strokes prior to and subsequent to the current stroke in a stroke-order for each stroke of the input pattern, and the affine transformation operation is determined such that overlapping between the strokes and a plurality of corresponding strokes in the reference patterns is maximized.

According to this embodiment, the affine transformation operation including a current stroke and a proper number of strokes prior to and subsequent to the current stroke in a stroke-order for each stroke is optimized, so that capability of absorbing distortion can be controlled depending on the degree of handwriting distortion included in character data.

In another preferred embodiment of the present invention, in calculation of the inter-pattern distance, the inter-pattern distance is calculated by also adding the sum of distances of corresponding stroke pairs between the input pattern and the reference pattern.

According to this embodiment, erroneous recognition caused such that the distance between inter-pattern distances of similarly shaped but different characters is decreased by excessive normalization can be prevented.

In still another preferred embodiment of the present invention, when the stroke-numbers of the extracted reference patterns is to be made equal to the stroke-number of the input pattern, the large stroke-number is made equal to the small stroke-number.

In still another embodiment of the present invention, when the strokes of the extracted reference patterns one-to-one-correspond to the strokes of the input pattern, the numbers of feature points of each stroke pair are made equal to each other.

In still another preferred embodiment of the present invention, when strokes constituting a character for each character category are expressed by a predetermined number of feature points, and the position coordinates of the feature points are stored as reference patterns in advance, a plurality of character patterns are expressed by feature points for each character category, and the average position coordinates of the feature points are stored as reference patterns in advance.

According to this embodiment, especially, reference patterns can be easily formed.

In still another preferred embodiment of the present invention, in extraction of the feature points, a predetermined number of points which increases with a stroke length including the start and end points of each stroke are extracted.

In order to achieve the above object, the present invention provides an on-line handwritten character recognition apparatus characterized by comprising: character information input means in which an input pattern of a handwritten character is input; feature point extracting means for expressing strokes constituting the input pattern by a predetermined number of feature points; reference pattern storing means for expressing strokes constituting a character for each character category by a predetermined number of feature points and storing position coordinates of the feature points as reference patterns in advance; stroke correspondence determining means for extracting the reference pattern for each character category and determining a one-to-one stroke correspondence which absorbs variations in stroke-number and stroke-order between the extracted reference pattern and the input pattern; stroke affine transformation operation determining means for determining an affine transformation operation for each corresponding stroke of the input pattern such that overlapping between the corresponding stroke of the input pattern and corresponding stroke of the extracted reference pattern is maximized; normalized input pattern forming means for performing an affine transformation operation to each stroke of the input pattern on the basis of the determined affine transformation operation to form a normalized input pattern; inter-pattern distance calculating means for calculating an inter-pattern distance based on the sum of distances of corresponding stroke pairs between the extracted reference pattern and the normalized input pattern; and inter-pattern distance re-arranging means for, on the basis of the inter-pattern distances between all reference patterns and normalized input patterns formed for all the reference patterns, sequentially defining character categories as candidate categories related to the input pattern from a character category according to reference pattern having small inter-pattern distance.

In a preferred embodiment of the present invention, the reference patterns are input through the character information input means, and feature points of the reference patterns are extracted by the feature point extracting means.

In another preferred embodiment of the present invention, a plurality of character patterns are input for each character category through the character information input means, and feature point average position coordinate calculating means for calculating average position coordinates of a plurality of feature points of a plurality of corresponding strokes of the plurality of character patterns is further arranged after the feature point extracting means.

According to this embodiment, especially, reference patterns are easily formed.

The nature, principle and utility of the invention will become more apparent from the following detailed description when read in conjunction with the accompanying drawings.

FIG. (3A/3B) is a view showing a process of making the numbers of feature points of each stroke pair equal to each other;

FIG. 4 is a view for explaining a process in a stroke affine transformation operation determining unit;

FIG. 5 is a view for explaining a process in a stroke affine transformation operation determining unit;

FIGS. 6A to 6D are views showing processes related to a character category " 泣 "; and FIGS. 7A to 7D are views showing processes related to a character category "永".

DESCRIPTION OF THE PREFERRED EMBODIMENTS

Embodiments of the present invention will be described below with reference to the accompanying drawings.

Figure 1:
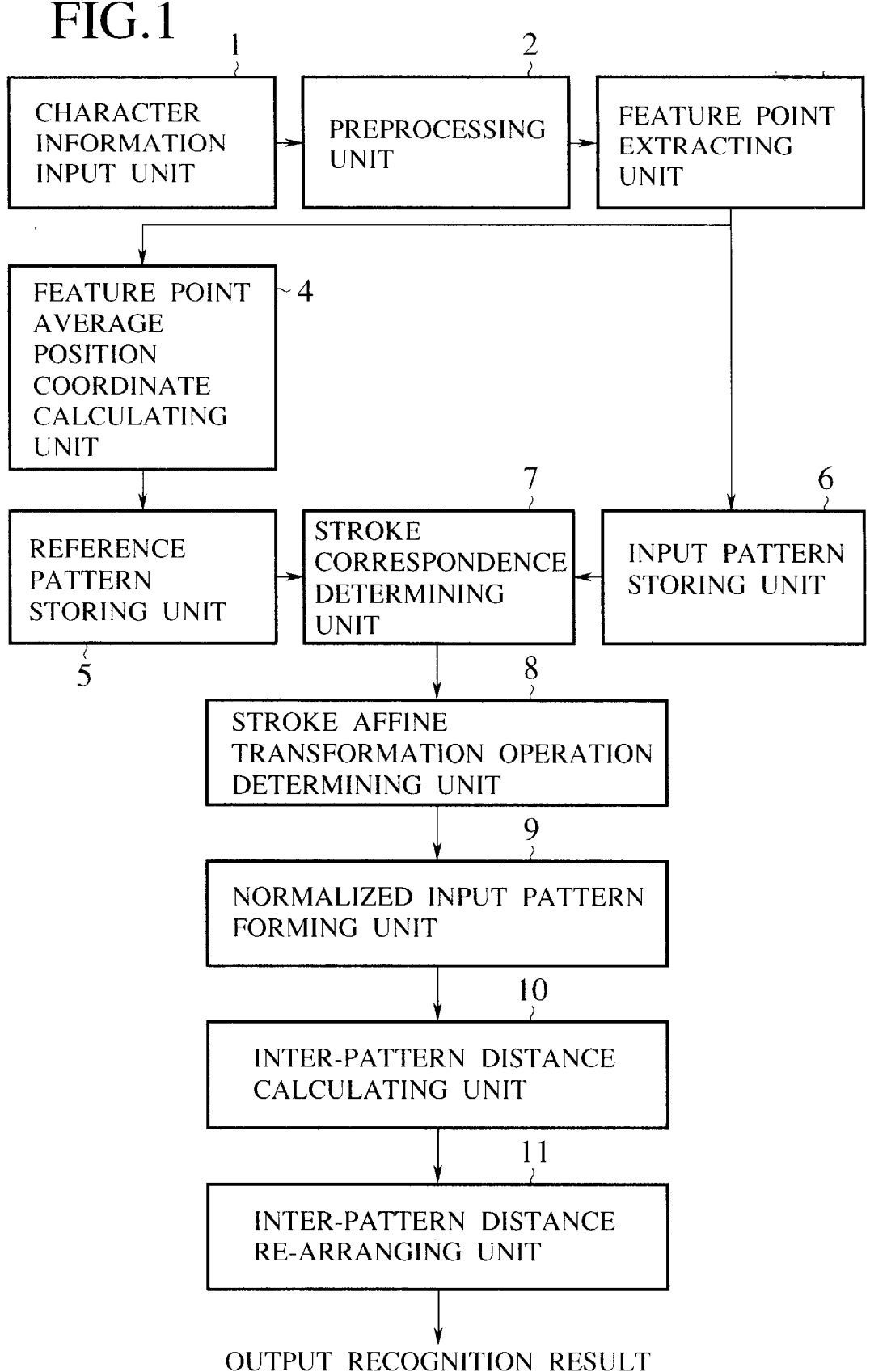
FIG. 1 is a block diagram showing an arrangement of an on-line handwritten character recognition apparatus according to an embodiment of the present invention.

FIG. 1 is a block diagram showing an arrangement of an on-line handwritten character recognition apparatus according to an embodiment of the present invention.

Referring to FIG. 1, reference numeral 1 denotes a character information input unit; 2, a preprocessing unit; 3, a feature point extracting unit; 4, a feature point average position coordinate calculating unit; 5, a reference pattern storing unit; 6, an input pattern storing unit; 7, a stroke correspondence determining unit; 8, a stroke affine transformation operation determining unit; 9, a normalized input pattern forming unit; 10, an inter-pattern distance calculating unit; and 11, an inter-pattern distance re-arranging unit.

An operation of each unit will be described below in detail.

The character information input unit 1 is preferably constituted by an existing data tablet, and time-series data of position coordinates of the written points of each stroke of handwriting of one character pattern drawn with a dedicated pen is input on the data tablet, and is transmitted to the preprocessing unit 2. The character information input unit 1 is used when a plurality of handwritten character patterns belonging to each character category for forming a reference pattern are input, and is also used when an input pattern is input.

The preprocessing unit 2 performs processes such as noise reduction and position and size normalization based on a known technique to the written point position coordinate string of one character pattern transmitted from the character information input unit 1, and then transmits the processed written point position coordinate string to the feature point extracting unit 3. The preprocessing unit 2 is also used in both inputting handwritten character patterns for forming the reference patterns and inputting an input pattern.

Figure 2:
FIG. 2 is a view showing a case wherein feature points are extracted from written points.

The feature point extracting unit 3 sequentially extracts written points closest to positions where a stroke is divided at equal intervals by the predetermined number of points which includes the start and end points of the stroke and whose number increases with a stroke length from each written point string constituting each stroke with respect to the written point position coordinate string of one character pattern transmitted from the preprocessing unit 2, and stores the written points as the feature point string of one character pattern. In this case, in selection of a total feature point number p corresponding to the stroke length, the total feature point number may be discretely increased with an increase in stroke length, for example, p=2, 3, 5, 9, 17, .... For example, p=2 corresponds to that only the start and end points of a stroke are extracted, and p=3 corresponds to that the start, end, and intermediate points of a stroke are extracted. FIG. 2 shows a case wherein feature points are extracted from written points of, e.g., a character category "い". Of the feature point strings of strokes of one character obtained at this time, feature point strings according to the reference patterns are transmitted to the feature point average position coordinate calculating unit 4, and feature point strings according to the input pattern are transmitted to the input pattern storing unit 6.

Using the feature point strings, which are transmitted from the feature point extracting unit 3, of a large number of character patterns written in a correct stroke-number and a correct stroke-order and collected for each character category to be recognized, the feature point average position coordinate calculating unit 4 calculates the average position coordinates of feature points of strokes constituting each character category, and transmits the average position coordinates to the reference pattern storing unit 5 as feature point average position coordinates.

With respect to each character category to be recognized, the reference pattern storing unit 5 stores, as the reference pattern of the character category, a pattern obtained by connecting the average position coordinates of the feature points constituting the strokes transmitted from the feature point average position coordinate calculating unit 4 according to a correct stroke-number and a correct stroke-order. In this case, when each reference stroke constituting the reference pattern of each character category is represented by R, as indicated by equation (1), R can be expressed by a pattern obtained by connecting the average position vectors of the feature points of the reference stroke, and the reference pattern is obtained by storing the respective reference strokes according to a correct stroke-order.

$$R=(r_1, r_2, ..., r_i, ..., r_p) \qquad (1)$$

where p: total feature point number defined by reference stroke length $r_i=(r_{ix}, r_{iy})^T$: average position vector of ith feature point of reference stroke A set of reference patterns of all character categories expressed by the average position coordinates of feature points constituting each stroke is transmitted to the stroke correspondence determining unit 7.

With respect to a character pattern to be recognized which is written in an arbitrary stroke-number and an arbitrary stroke-order, the input pattern storing unit 6 stores, as the input pattern of the character category, a pattern obtained by connecting the position coordinates of feature points constituting each stroke transmitted from the feature point extracting unit 3 according to a stroke-number and a stroke-order. In this case, when each input stroke constituting the input pattern is represented by S, as indicated by equation (2), S can be expressed as a pattern obtained by connecting position vectors of the feature points of the input stroke. The input pattern is obtained by storing input strokes according to a stroke-order.

$$S=(s_1, s_2, ..., s_j, ..., s_{p'}) \qquad (2)$$

where p': total feature point number defined by input stroke length $s_j=(s_{jx}, s_{jy})^T$: position vector of jth feature point of input stroke The input pattern expressed by the position coordinates of the feature points constituting each stroke is transmitted to the stroke correspondence determining unit 7.

The stroke correspondence determining unit 7 determines a one-to-one stroke correspondence which absorbs variations in stroke-number and stroke-order between an input pattern, to be recognized, transmitted from the input pattern storing unit 6 and the reference patterns of character categories transmitted from the reference pattern storing unit 5. It is assumed that a larger one of the stroke-numbers of the input pattern and the reference pattern is represented by M and that a smaller one is represented by N (M≧N). In this unit, by making the stroke-numbers of both the patterns equal to the small stroke-number N, N pairs of stroke correspondences are determined. In order to determine such an optimum one-to-one stroke correspondence, a known technique can be used. For example, in a technique described in a paper titled as "On-Line Cursive Kanji Character Recognition as Stroke Correspondence Problem" by T. Wakahara, et al. in Proceedings of the Third International Conference on Document Analysis and Recognition (Montreal, Canada; August 14–16, 1995; IEEE COMPUTER SOCIETY), a stroke correspondence is determined by two processes. In the first process, N pairs of optimum stroke correspondences in which the sum of inter-stroke distances between all the strokes of an N-stroke pattern and N strokes in an M-stroke pattern is minimized is determined using a discrete combinatorial optimization method. According to this process, a variation in stroke-order is absorbed. In the second process, each of (M−N) strokes, which does not correspond to any stroke of an N-stroke pattern, in the M-stroke pattern is caused to be selectively integrated with one of two corresponded strokes which are stroke-ordered prior to and subsequent to the not-corresponded stroke such that the M-stroke pattern preferably overlaps the N-stroke pattern. According to this processing, a variation in stroke-number is absorbed, and the stroke-numbers of both the patterns are made equal to the stroke-number N.

Figure 3A:
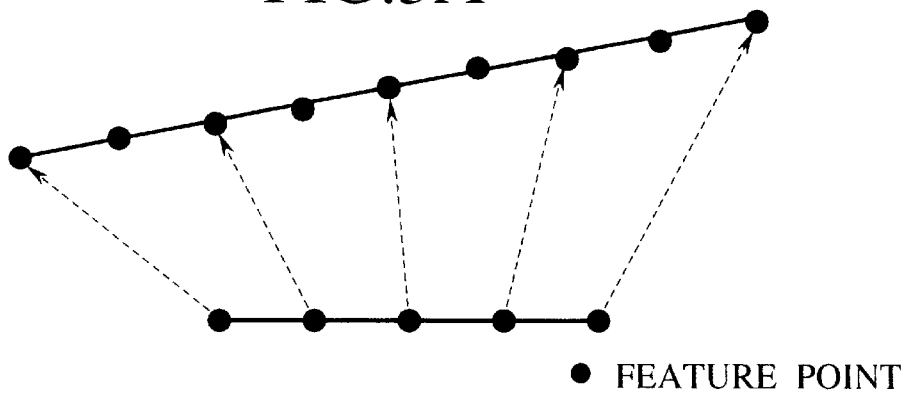
Figure 3B:
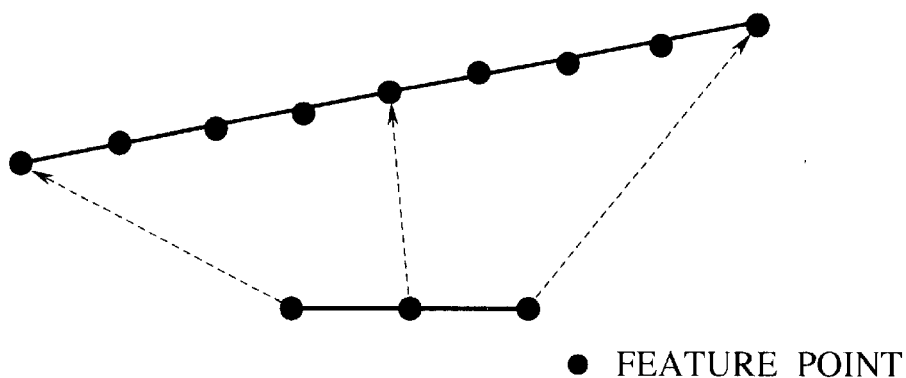
Figure 7A:
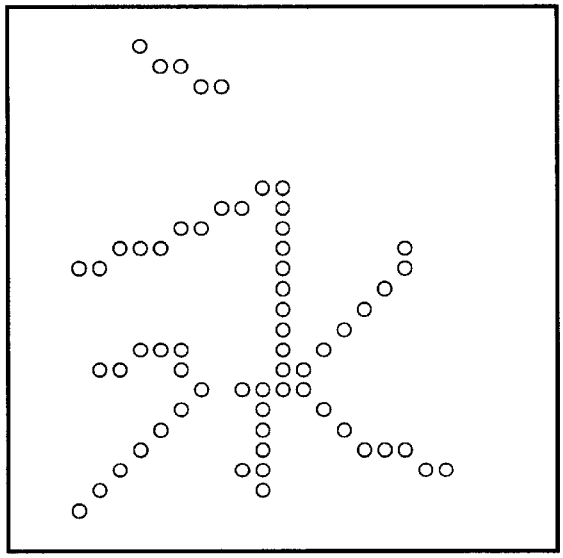
Figure 7B:
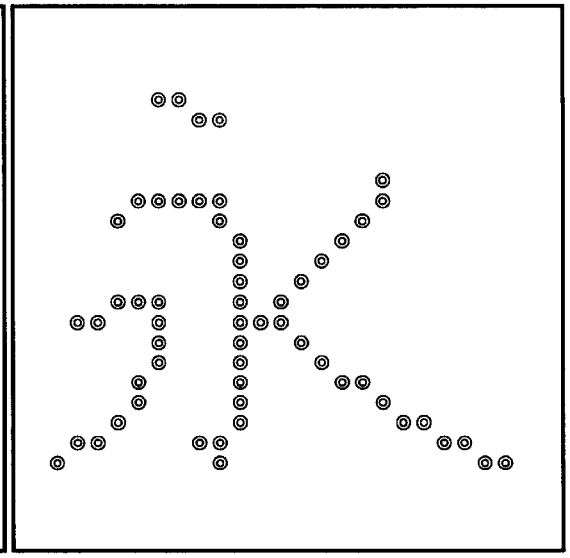
Figure 7C:
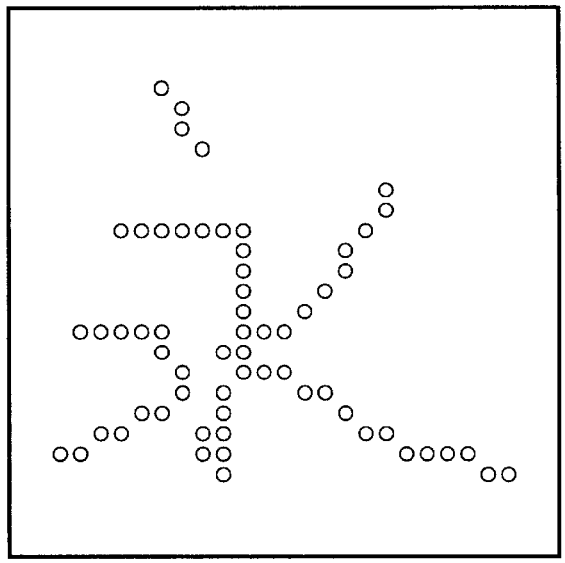
Figure 7D:
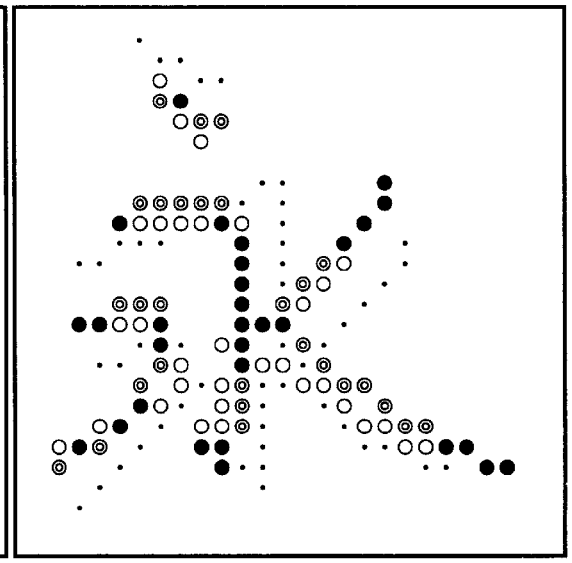

According to the stroke correspondence determining operation described above, both the patterns become N-stroke patterns, respectively, and N pairs of stroke correspondences can be obtained. With respect to the input and reference patterns whose stroke-numbers are equal to the stroke-number N, the feature point string expressions of N strokes constituting the input pattern are represented by $S_1$, $S_2, \ldots, S_i, \ldots, S_N$ in accordance with the stroke-order, the feature point string expressions of N strokes constituting the reference pattern are represented by $R_1, R_2, \ldots, R_i, \ldots, R_N$, and it is assumed that $R_i$ ($1 \leq i \leq N$) is caused to correspond to $S_i$ ($1 \leq i \leq N$), respectively. As shown in FIGS. 3A and 3B, it is assumed that the numbers of feature points are made equal to each other in each stroke pair. The feature point string expressions of the input pattern and reference pattern which have equal stroke-numbers, the same stroke-order, and equal feature point numbers are transmitted to the stroke affine transformation operation determining unit 8.

The stroke affine transformation operation determining unit 8, by using the input pattern and the reference pattern which have equal stroke-numbers, the same stroke-order, and equal feature point numbers and are transmitted from the stroke correspondence determining unit 7, performs, with respect to each stroke constituting the input pattern, an affine transformation operation to a plurality of strokes including a current stroke, thereby determining an optimum affine transformation operation such that the plurality of strokes constituting the input pattern maximally overlap a plurality of corresponding strokes in the reference pattern. The optimum affine transformation operation corresponding to the ith stroke $S_i$ ($1 \leq i \leq N$) is determined by the following procedures.

By using that correlation of handwriting distortion between connected strokes is large, a plurality of strokes including $n_1$ strokes prior to a current stroke in a stroke-order and $n_2$ strokes subsequent to a current stroke in the stroke-order are extracted. In this case, $n_1 \geq 0$ and $n_2 \geq 0$ are satisfied, for example, $n_1=1$ and $n_2=1$ or $n_1=1$ and $n_2=0$ are used. More specifically, when $u=\max(1, i-n_1)$ and $v=\min(N, i+n_2)$ are defined for $S_i$ ($1 \leq i \leq N$), a plurality of strokes $S_u$, $S_{u+1}, \ldots, S_i, \ldots, S_{v-1}$, and $S_v$ are extracted. This procedure will be exemplified. For example, it is assumed that a character category " 泣 " is used. In this case, as shown in FIG. 4, there are strokes $S_1$ to $S_8$. It is assumed that the stroke $S_2$ is selected as a current stroke, i.e., the ith stroke $S_i$. In this case, for example, $n_1=1$ and $n_2=1$, i.e., a plurality of strokes $S_1$, $S_2$, and $S_3$ including the previous stroke $S_1$ and the following stroke $S_3$ are extracted. When the stroke $S_8$ is selected as the ith stroke $S_i$, even if $n_1=1$ and $n_2=1$ are set, there is no following stroke. For this reason, a plurality of strokes $S_7$ and $S_8$ including only the previous stroke $S_7$ are extracted.

The number of all feature points included in these strokes is represented by q, and a pattern obtained by connecting the position vectors of the q feature points according to the stroke-order is expressed by equation (3).

$$C_1 = (s'_1, s'_2, \ldots, s'_k, s'_q) \tag{3}$$

For example, as described above, when the stroke $S_2$ is selected as the ith stroke $S_i$, feature points are constituted as shown in FIG. 5. In this case, $C_1$ is expressed by equation (4)

$$C_1 = (s_1, s_2, \ldots, s_{19}) \tag{4}$$

In the reference pattern, $R_u, \ldots, R_i, \ldots, R_v$ correspond to a plurality of strokes $S_u, \ldots, S_i, \ldots, S_v$. The number of all feature points included in these strokes of the reference pattern is equal to that in the corresponding strokes of the input pattern, i.e., q. A pattern obtained by connecting the position vectors of the q feature points included in these strokes of the reference pattern according to the stroke-order is expressed by equation (5).

$$C_2 = (r'_1, r'_2, \ldots, r'_k, \ldots r'_q) \tag{5}$$

An affine transformation operation defined by equation (6) is performed to feature points $S'_k$ included in the feature point string $C_1$ according to the ith stroke $S_i$ of the input pattern, and affine transformation operations $A_i$ and $b_i$ are determined such that transformation is performed to the feature point string $C_1$ to cause the feature point string $C_1$ to maximally overlap the feature point string $C_2$, i.e., an objective function $\Psi_i$ expressed by equation (7) is minimized.

$$s''_k = A_i s'_k + b_i (1 \leq k \leq q) \tag{6}$$

where $A_1$: scale change, rotation, and shearing are expressed by 2×2 matrix $b_i$: translation is expressed by two-dimensional vector $$\Psi_i = \Sigma_k \|s''_k - r'_k\|^2 = \Sigma_k \|A_i s'_k + b_i - r'_k\|^2 \tag{7}$$

($1 \leq i \leq N$)

where $\Sigma_k$: sum of k=1, ..., q $\| \|$: Euclidean norm of vector

A problem related to minimization of the objective function $\Psi_i$ can be solved by a method of solving simultaneous linear equations related to the components of the affine transformation operations $A_i$ and $b_i$ according to the known technique. The solution can be obtained at a high speed.

The optimum affine transformation operations for the strokes $S_i$ of the input pattern are determined as described above. Then, combinations $\{A_i, b_i\}$ ($1 \leq i \leq N$) of the stroke affine transformation operations and the feature point string expressions of the input and reference patterns are transmitted to the normalized input pattern forming unit 9.

By using the combinations of the stroke affine transformation operations for the strokes of the input pattern and the feature point string expressions of the input and reference patterns which are transmitted from the stroke affine transformation operation determining unit 8, the normalized input pattern forming unit 9 performs the stroke affine transformation operations to the strokes of the input pattern to form a normalized input pattern. In this case, the feature point string of the ith stroke $S_i$ of the input pattern and the feature point string of the ith stroke $R_i$ of the corresponding reference patterns are represented by equations (8) and (9). Note that the number of feature point is represented by p, and the numbers of strokes are made equal to each other.

$$S_i=(s_1, s_2, ..., s_k, ..., s_p) \qquad (8)$$

$$R_i=(r_1, r_2, ..., r_k, ..., r_p) \qquad (9)$$

Formation of a normalized input pattern is performed to each stroke of the input pattern. A normalizing operation for the ith stroke $S_i$ ($1 \leq i \leq N$) of the input pattern is performed to the feature points of the corresponding stroke using the stroke affine transformation operations $A_i$ and $b_i$ according to equation (10).

$$s''_k = A_i s_k + b_i (1 \leq i \leq p) \qquad (10)$$

A pattern obtained by connecting $s''_k$ ($1 \leq k \leq p$) to each other constitutes a normalized input stroke $S''_i$. The normalized input pattern is expressed as a normalized input stroke string $\{S''_i\}$ ($1 \leq i \leq N$). The feature point string expressions of the normalized input pattern and the reference patterns are transmitted to the inter-pattern distance calculating unit 10.

FIGS. 6A to 6D are views showing processes related to a character category " 江 ". FIG. 6A is a view showing an input pattern, FIG. 6B is a view showing a reference pattern, and FIG. 6C is a view showing a normalized input pattern. FIG. 6D is a view obtained by overlapping the drawings of FIGS. 6A to 6C. Referring to FIG. 6D, "•" represents a point of the input pattern, "⊙" indicates a point of the reference pattern, "○" indicates a point of the normalized input pattern, and "●" indicates a point obtained by overlapping the points of the reference patterns and the normalized input pattern. Note that the intervals between the feature points in a stroke are indicated by inserted point strings.

FIGS. 7A to 7D are views showing processes related to a character category " 永 ".

By using the feature point string expressions of the normalized input pattern and the reference patterns which are transmitted from the normalized input pattern forming unit 9, the inter-pattern distance calculating unit 10 calculates an inter-pattern distance based on the sum of the distances of corresponding stroke pairs between the normalized input pattern and the reference pattern. As described above, the normalized input stroke $S''_i$ ($1 \leq i \leq N$) corresponds to the ith stroke $R_i$ of the reference pattern. First, an inter-stroke distance $d(S''_i, R_i)$ between $S''_i$ and $R_i$ serving as a corresponding stroke pair is calculated by equation (11).

$$d(S''_i, R_i) = (1/p) \Sigma_k \| s''_k - r_k \|^2 \qquad (11)$$

where $\Sigma_k$: sum related to k=1, . . . , p

An inter-pattern distance D between the normalized input pattern and the reference patterns is calculated on the basis of the sum of the inter-stroke distances by equation (12).

$$D = (M/N) \Sigma_i d(S''_i, R_i) \qquad (12)$$

where $\Sigma_i$: sum related to i=1, . . . , N

M/N: normalization multiplier ($\geq 1$) reflected by stroke-number difference

In order to estimate and add the degree of overlapping before normalization, equation (13) may be used.

$$D = (M/N) \Sigma_i [d(S''_i, R_i) + d(S_i, R_i)] \qquad (13)$$

When equation (13) is used, misrecognition caused by a decrease in inter-pattern distance difference between similarly shaped but different characters by excessive normalization can be prevented. The calculated inter-pattern distance D is transmitted to the inter-pattern distance re-arranging unit 11 to be temporarily stored therein.

The operations in the above units 7 to 10 are iteratively performed between the input pattern and the reference patterns of all the character categories to be recognized, and the calculated inter-pattern distances are sequentially transmitted to the inter-pattern distance re-arranging unit 11 to be stored therein.

The inter-pattern distance re-arranging unit 11 rearranges the inter-pattern distances D calculated for all the character categories to be recognized in the order of increasing distance, and sequentially outputs the character categories to be recognized in the order of increasing distance D as candidate categories of the input pattern.

As described above, in this embodiment, by using a large number of character patterns written in a correct stroke-number and a correct stroke-order with respect to character categories to be recognized, the average position coordinates of the feature points of strokes are calculated and stored as a reference character pattern. A character pattern which is written in an arbitrary stroke-number and an arbitrary stroke-order and whose category is unknown is expressed by an input pattern constituted by the feature points of strokes. An optimum one-to-one stroke correspondence whose stroke-number is made equal to a smaller one of the stroke-numbers of the input pattern and the reference patterns of the character categories is determined. In addition, an affine transformation operation which is optimum for the strokes of the input pattern is performed to each stroke of the input pattern such that the degree of overlapping between the corresponding strokes increases to form a normalized input pattern, thereby performing pattern matching between the input pattern and the reference pattern. Therefore, according to the above processes, recognition accuracy can be considerably improved when large or unexpected distortion occurs. In particular, since an affine transformation operation is not performed to an overall pattern or to each feature point, but is performed to each stroke, a stable normalizing operation which is not too hard and too soft can be realized. In addition, not only improvement of such robustness against handwriting distortion can be realized, but also a decrease in dictionary size can be realized, and a processing time can be sufficiently suppressed as a matter of course. Furthermore, when affine transformation operations for a proper number of strokes including strokes prior to and subsequent to a current stroke in a stroke-order are optimized, the capability of absorbing distortion can be controlled depending on the degree of handwriting distortion included in character data to be recognized.

It should be understood that many modifications and adaptations of the invention will become apparent to those skilled in the art and it is intended to encompass such obvious modifications and changes in the scope of the claims appended hereto.

What is claimed is:

1. An on-line handwritten character recognition method comprising the steps of:

expressing strokes constituting a character by a predetermined number of feature points for each character category and storing position coordinates of the feature points as reference patterns in advance;

expressing an input pattern of an input handwritten character by the feature points;

extracting the reference pattern for each character category;

determining a one-to-one stroke correspondence which absorbs variations in stroke-number and stroke-order between the extracted reference pattern and the input pattern;

determining an affine transformation operation for each corresponding stroke of the input pattern such that overlapping between the stroke and corresponding stroke of the extracted reference patterns is maximized;

performing an affine transformation to each stroke of the input pattern on the basis of the determined affine transformation operation to form a normalized input pattern;

calculating an inter-pattern distance based on the sum of distances of corresponding stroke pairs between the extracted reference pattern and the normalized input pattern; and defining, on the basis of inter-pattern distances between all reference patterns and normalized input patterns formed for all the reference patterns, character categories of all the reference patterns sequentially as candidate categories related to the input pattern in the order of their increasing inter-pattern distance, characterized in that in calculation of the inter-pattern distance, the inter-pattern distance is calculated by also adding the sum of distances of corresponding stroke pairs between the input pattern and the reference pattern.

2. An on-line handwriting character recognition method according to claim 1, characterized in that, in determination of the affine transformation operation for each stroke, assuming that an affine transformation operation is performed to the plurality of strokes including a current stroke and a proper number of strokes prior to and subsequent to the current stroke in a stroke-order for each stroke of the input pattern, the affine transformation operation for the current stroke is determined such that overlapping between the strokes and a plurality of corresponding strokes in the reference patterns is maximized.

3. An on-line handwritten character recognition method according to claim 1, characterized in that, when the stroke-numbers of the extracted reference patterns are to be made equal to the stroke-number of the input pattern, the large stroke-number is made equal to the small stroke-number.

4. An on-line handwritten character recognition method according to claim 1, characterized in that, when strokes constituting a character for each character category are expressed by a predetermined number of feature points, and the position coordinates of the feature points are stored as reference patterns in advance, a plurality of character patterns are expressed by feature points for each character category, and the average position coordinates of the feature points are stored as reference patterns in advance.

5. An on-line handwritten character recognition method according to claim 1, characterized in that, in extraction of the feature points, a predetermined number of points which increases with a stroke length including the start and end points of each stroke are extracted.

6. An on-line handwritten character recognition method according to claim 5, wherein the predetermined number of points which increases with a stroke length including the start and end points of each stroke is determined as 2, 3, 5, 9, or 17.

7. An on-line handwritten character recognition apparatus characterized by comprising:

character information input means in which an input pattern of a handwritten character is input;

feature point extracting means for expressing strokes constituting the input pattern by a predetermined number of feature points;

reference pattern storing means for expressing strokes constituting a character for each character category by a predetermined number of feature points and storing position coordinates of the feature points as reference patterns in advance;

stroke correspondence determining means for extracting the reference pattern for each character category and determining a one-to-one stroke correspondence which absorbs variations in stroke-number and stroke-order between the extracted reference pattern and the input pattern;

stroke affine transformation operation determining means for determining an affine transformation operation for each corresponding stroke of the input pattern such that overlapping between the stroke and corresponding stroke of the extracted reference pattern is maximized;

normalized input pattern forming means for performing an affine transformation to each stroke of the input pattern on the basis of the determined affine transformation operation to form a normalized input pattern;

inter-pattern distance calculating means for calculating an inter-pattern distance based on the sum of distances of corresponding stroke pairs between the extracted reference patterns and the normalized input pattern; and inter-pattern distance re-arranging means for, on the basis of inter-pattern distances between all reference patterns and normalized input patterns formed for all the reference patterns, sequentially defining character categories of all the reference patterns as candidate categories related to the input pattern in the order of their increasing inter-pattern distance, characterized in that, in calculation of the inter-pattern distance, said inter-pattern distance calculating means calculates the interpattern distance by also adding the sum of distances of corresponding stroke pairs between the input pattern and the reference pattern.

8. An on-line handwriting character recognition apparatus according to claim 7, characterized in that, in determination of the affine transformation operation for each stroke, said stroke affine transformation operation determining means, assuming that an affine transformation operation is performed to the plurality of strokes including a current stroke and a proper number of strokes prior to and subsequent to the current stroke in a stroke-order for each stroke of the input pattern, and determines the affine transformation operation for the current stroke such that overlapping between the strokes and a plurality of corresponding strokes in the reference patterns is maximized.

9. An on-line handwritten character recognition apparatus according to claim 7, characterized in that, when the stroke-numbers of the extracted reference patterns are to be made equal to the stroke-numbers of the input pattern, said stroke correspondence determining means makes the large stroke-number equal to the small stroke-number.

10. An on-line handwritten character recognition apparatus according to claim 7, characterized in that, in extraction of the feature points, said feature point extraction means extracts the predetermined number of points which increases with a stroke length including the start and end points of each stroke.

11. An on-line handwritten character recognition apparatus according to claim 10, wherein said feature point extracting means determines the predetermined number of points which increases with a stroke length including the start and end points of each stroke as 2, 3, 5, 9, or 17.

12. An on-line handwritten character recognition apparatus according to claim 7, characterized in that, the reference patterns are input through said character information input means, and feature points of each reference pattern are extracted by said feature point extracting means.

13. An on-line handwritten character recognition apparatus according to claim 7, characterized in that, a plurality of character patterns are input for each character category through said character information input means, and feature point average position coordinate calculating means for calculating average position coordinates of a plurality of feature points of a plurality of corresponding strokes of the plurality of character patterns is further arranged after said feature point extracting means.

* * * * *